US008713600B2

(12) United States Patent
Shkedi

(10) Patent No.: US 8,713,600 B2
(45) Date of Patent: Apr. 29, 2014

(54) USER CONTROL OF REPLACEMENT TELEVISION ADVERTISEMENTS INSERTED BY A SMART TELEVISION

(71) Applicant: Roy Shkedi, New York, NY (US)

(72) Inventor: Roy Shkedi, New York, NY (US)

(73) Assignee: Almondnet, Inc., New York, NY (US)

( * ) Notice: Subject to any disclaimer, the term of this patent is extended or adjusted under 35 U.S.C. 154(b) by 0 days.

(21) Appl. No.: 13/754,639

(22) Filed: Jan. 30, 2013

(65) Prior Publication Data

US 2013/0152126 A1    Jun. 13, 2013

(51) Int. Cl.
*H04N 7/10* (2006.01)
*H04N 7/025* (2006.01)
*H04N 21/458* (2011.01)
*H04N 21/432* (2011.01)

(52) U.S. Cl.
CPC .......... *H04N 21/458* (2013.01); *H04N 21/432* (2013.01)
USPC ........................................................ 725/32

(58) Field of Classification Search
None
See application file for complete search history.

(56) References Cited

U.S. PATENT DOCUMENTS

| | | | |
|---|---|---|---|
| 6,160,989 A | 12/2000 | Hendricks et al. | |
| 6,216,129 B1 | 4/2001 | Eldering | |
| 6,366,298 B1 | 4/2002 | Haitsuka et al. | |
| 6,446,261 B1 | 9/2002 | Rosser | |
| 6,832,207 B1 | 12/2004 | Shkedi | |
| 6,845,396 B1 | 1/2005 | Kanojia | |
| 6,925,440 B1 | 8/2005 | Shkedi | |
| 6,973,436 B1 | 12/2005 | Shkedi | |
| 7,020,888 B2 | 3/2006 | Reynolds et al. | |
| 7,043,746 B2 | 5/2006 | Ma | |
| 7,072,853 B2 | 7/2006 | Shkedi | |
| 7,092,926 B2 | 8/2006 | Cerrato | |
| 7,103,904 B1 | 9/2006 | Blackketter et al. | |
| 7,152,237 B2 | 12/2006 | Flickinger et al. | |
| 7,260,823 B2 | 8/2007 | Schlack et al. | |
| 7,428,493 B2 | 9/2008 | Shkedi | |
| 7,454,364 B2 | 11/2008 | Shkedi | |
| 7,747,745 B2 | 6/2010 | Shkedi | |
| 7,818,763 B2 | 10/2010 | Sie et al. | |
| 7,822,637 B2 | 10/2010 | Shkedi | |
| 7,822,639 B2 | 10/2010 | Shkedi | |
| 7,861,260 B2 | 12/2010 | Shkedi | |
| 7,890,609 B2 | 2/2011 | Shkedi | |
| 7,899,915 B2 | 3/2011 | Reisman | |
| 7,941,528 B2 | 5/2011 | Hicks et al. | |
| 7,979,307 B2 | 7/2011 | Shkedi | |
| 7,984,466 B2 | 7/2011 | Eldering et al. | |
| 7,987,491 B2 | 7/2011 | Reisman | |
| 8,051,444 B2 | 11/2011 | Shkedi | |
| 8,065,696 B2 * | 11/2011 | Scott et al. ........................ | 725/8 |
| 8,079,052 B2 | 12/2011 | Chen et al. | |
| 8,108,895 B2 | 1/2012 | Anderson et al. | |
| 8,166,501 B2 | 4/2012 | Shikuma | |
| 8,200,822 B1 | 6/2012 | Shkedi | |
| 8,204,783 B2 | 6/2012 | Shkedi | |
| 8,204,965 B2 | 6/2012 | Shkedi | |
| 8,239,264 B2 | 8/2012 | Shkedi | |
| 8,244,574 B2 | 8/2012 | Shkedi | |
| 8,244,582 B2 | 8/2012 | Shkedi | |
| 8,244,583 B2 | 8/2012 | Shkedi | |
| 8,244,586 B2 | 8/2012 | Shkedi | |
| 8,280,758 B2 | 10/2012 | Shkedi | |
| 8,281,336 B2 | 10/2012 | Shkedi | |
| 8,307,390 B2 * | 11/2012 | Holden ........................... | 725/34 |
| 8,341,247 B2 | 12/2012 | Shkedi | |
| 8,375,409 B2 * | 2/2013 | Chang et al. .................... | 725/47 |
| 2002/0013943 A1 | 1/2002 | Haberman et al. | |
| 2002/0059602 A1 | 5/2002 | Macrae et al. | |
| 2002/0078444 A1 | 6/2002 | Krewin et al. | |
| 2002/0082910 A1 | 6/2002 | Kontogouris | |
| 2002/0120929 A1 | 8/2002 | Schwalb et al. | |
| 2002/0120933 A1 | 8/2002 | Knudson et al. | |
| 2002/0123928 A1 | 9/2002 | Eldering et al. | |
| 2002/0124249 A1 | 9/2002 | Shintani | |
| 2002/0124253 A1 | 9/2002 | Eyer et al. | |
| 2002/0129368 A1 | 9/2002 | Schlack et al. | |
| 2002/0178443 A1 | 11/2002 | Ishii | |

(Continued)

FOREIGN PATENT DOCUMENTS

JP    2008048230 A    8/2008
KR   10-2006-0025219   3/2006

OTHER PUBLICATIONS

"Venture Market Summary"; VentureWire Alert; Mar. 29, 2005.

(Continued)

*Primary Examiner* — Oschta Montoya
(74) *Attorney, Agent, or Firm* — Louis J. Hoffman; David S. Alavi

(57) ABSTRACT

A method is performed using a smart TV, which receives from a television signal source device a television signal feed encoding primary television content and then presents that content. The smart TV receives data via the computer network, including first data representing a to-be-replaced portion of the primary television content and second data representing secondary television content. Using the second data, the smart TV automatically presents the secondary television content in place of the to-be-replaced television content. The method includes the smart TV: (a) automatically monitoring, during presentation of the secondary television content, the television signal feed and comparing it with the first data; and (b) automatically altering presentation of the secondary television content in accordance with a user-control action with respect to the television signal source device, in response to detecting any difference between the television signal feed and the first data indicative of that user-control action.

27 Claims, No Drawings

(56) References Cited

U.S. PATENT DOCUMENTS

| | | |
|---|---|---|
| 2002/0191950 A1 | 12/2002 | Wang |
| 2003/0051242 A1 | 3/2003 | Donnelly |
| 2003/0066078 A1 | 4/2003 | Bjorgan et al. |
| 2003/0093792 A1 | 5/2003 | Labeeb |
| 2003/0126597 A1 | 7/2003 | Darby et al. |
| 2003/0135853 A1 | 7/2003 | Goldman et al. |
| 2003/0145323 A1 | 7/2003 | Hendricks et al. |
| 2003/0149975 A1 | 8/2003 | Eldering et al. |
| 2003/0188317 A1 | 10/2003 | Liew et al. |
| 2003/0208756 A1 | 11/2003 | Macrae et al. |
| 2003/0208758 A1 | 11/2003 | Schein et al. |
| 2003/0226141 A1 | 12/2003 | Krasnow et al. |
| 2004/0003406 A1 | 1/2004 | Billmaier |
| 2004/0005143 A1 | 1/2004 | Tsuru et al. |
| 2004/0034874 A1 | 2/2004 | Hord et al. |
| 2004/0107437 A1 | 6/2004 | Reichardt et al. |
| 2004/0117827 A1 | 6/2004 | Karaoguz et al. |
| 2004/0158858 A1* | 8/2004 | Paxton et al. ............... 725/42 |
| 2004/0163101 A1 | 8/2004 | Swix et al. |
| 2004/0172650 A1 | 9/2004 | Hawkins et al. |
| 2004/0228605 A1 | 11/2004 | Quan et al. |
| 2005/0034171 A1 | 2/2005 | Benya |
| 2005/0076359 A1 | 4/2005 | Pierson et al. |
| 2005/0086112 A1 | 4/2005 | Shkedi |
| 2005/0108776 A1 | 5/2005 | Carver et al. |
| 2005/0207731 A1 | 9/2005 | Unger |
| 2006/0013556 A1 | 1/2006 | Poslinski |
| 2006/0070095 A1 | 3/2006 | Newton et al. |
| 2006/0218602 A1 | 9/2006 | Sherer et al. |
| 2006/0222322 A1 | 10/2006 | Levitan |
| 2006/0235756 A1 | 10/2006 | Pellgrino |
| 2006/0277569 A1 | 12/2006 | Smith |
| 2007/0204310 A1 | 8/2007 | Hua et al. |
| 2008/0127246 A1 | 5/2008 | Sylvain |
| 2008/0256572 A1 | 10/2008 | Chen |
| 2009/0049468 A1 | 2/2009 | Shkedi |
| 2009/0100460 A1 | 4/2009 | Hicks, III et al. |
| 2009/0106792 A1 | 4/2009 | Kan et al. |
| 2009/0172723 A1 | 7/2009 | Shkedi et al. |
| 2009/0217324 A1 | 8/2009 | Massimi |
| 2010/0043022 A1 | 2/2010 | Kaftan |
| 2010/0058380 A1 | 3/2010 | Yu et al. |
| 2010/0058382 A1 | 3/2010 | Yu et al. |
| 2010/0269128 A1* | 10/2010 | Gordon ............... 725/25 |
| 2011/0321083 A1 | 12/2011 | Rouse et al. |
| 2012/0023522 A1 | 1/2012 | Anderson et al. |
| 2012/0159549 A1 | 6/2012 | Douillet et al. |
| 2013/0024888 A1* | 1/2013 | Sivertsen ............... 725/32 |

OTHER PUBLICATIONS

"TiVo Launches New Interactive Advertising Technology"; press release from www.tivo.com; Jul. 18, 2005.
"TiVo Announces First Advertising Search Product for Television"; press release from www.tivo.com; Nov. 28, 2005.
"TiVo Begins Rollout of Online Services Now Accessible Directly on the TV"; press release from www.tivo.com; Dec. 1, 2005.
"TiVo Launches Television's New Advertising Search Product"; press release from www.tivo.com; May 8, 2006.
"TiVo to Insert Ads At End of Programs"; The Wall Street Journal Online; Nov. 28, 2006.
Haughey, M.; "TiVo to add banner ads to service when fast forwarding"; www.PVRblog.com; Nov. 16, 2004.
Piccalo, G.; "TiVo Will No Longer Skip Past Advertisers; The tool that lets viewers control the TV will soon sport 'billboards' and track viewing habits"; Los Angeles Times; Nov. 17, 2004.
Rojas, P.; "TiVo planning banner ads for when you fast-forward"; www.engadget.com; Nov. 17, 2004.
Haughey, M.; "Icon ads over commercials at TiVo"; www.PRVblog.com; Mar. 29, 2005.
"Targeted Visitor Ad"; web page at http://adservices.zango.com/Advertise/SearchSolutions.aspx; 2007.
"Zango to Pay $3 Million, Settles FTC Charges"; archived web page at www.marketingvox.com; Nov. 3, 2006.
Nelson, M.G.; "Microsoft Launches Clickable Video Ads for Kohl's"; web page at http://clickz.com/3625272; Mar. 19, 2007.
Joe, R.; "EveryZing Makes Everything Searchable"; web page at http://www.speechtechmag.com/Articles/ReadArticle.aspx?ArticleID=39598; Sep. 11, 2007.
Luening, E.; "Free ISP NetZero beefs up ad services"; web page at http://www.news.com/Free-ISP-NetZero-beefs-up-ad-services/2100-1023_3-241067.html; Jan. 2, 2002.
Blinkx TV White Paper 1.0; Blinkx Inc.; Jan. 2005.
Mandese, J.; "AOL Unveils Video 'Ticker' Ads, New Alternative to Pre-Roll"; from www.mediapost.com; Nov. 19, 2007.
Roettgers, Janko; Your next TV set may show you advertising spots you actually like; GigaOM; http://gigaom.com; Dec. 14, 2012.
Constine, Josh; Gracenote's Ad Replacement System That Personalizes TV Commercials Will Start Trials in 2013; http://techcrunch.com; Dec. 26, 2012.
Friedman, Wayne; Gracenote, Invidi Deal Ups Real-Time Ad for TV; MediaDailyNews; http://www.mediapost.com; Jan. 16, 2013.
Mandese, Joe; Why Invidi's Deal With Gracenote Will Accelerate Real-Time TV Targeting; RTBlog; http://www.mediapost.com; Jan. 17, 2013.

* cited by examiner

ND STATES PATENT

USER CONTROL OF REPLACEMENT TELEVISION ADVERTISEMENTS INSERTED BY A SMART TELEVISION

BACKGROUND

The field of the present invention relates to targeted television ad replacement using a so-called "smart TV." In particular, systems and methods are disclosed herein for terminating or altering targeted television ad replacement in response to a user-control action.

A goal of modern television advertising is targeted selection of advertisements for individual households or even for specific viewers in those households. Numerous techniques and methodologies are available for (i) collecting user profile information from one or more sources (online or offline), (ii) using that profile information to select one or more targeted advertisements, (iii) using the profile information to select one or more programs or channels for presenting the targeted advertisements, and (iv) correlating subsequent viewer actions after presenting the targeted advertisements. Some of these techniques and methodologies are described in:

U.S. Pat. No. 7,861,260 entitled "Targeted television advertisements based on online behavior" issued Dec. 28, 2010 to Shkedi;

U.S. Pub. No. US 2009/0172728 entitled "Targeted online advertisements based on viewing or interacting with television advertisements" published Jul 2, 2009 in the names of Shkedi et al;

U.S. Pub. No. US 2009/0300675 entitled "Targeted television advertisements associated with online users' preferred television programs or channels" published Dec. 3, 2009 in the name of Shkedi;

U.S. Pat. No. 8,051,444 entitled "Targeted television advertisements selected on the basis of an online user profile and presented with television programs or channels related to that profile" issued Nov. 1, 2011 to Shkedi; and U.S. Pat. No. 7,890,609 entitled "Requesting offline profile data for online use in a privacy-sensitive manner" issued Feb. 15, 2011 to Shkedi.

Typically a targeted television advertisement is inserted into the stream of presented television content in place of a non-targeted advertisement. A "targeted advertisement" refers to an advertisement shown to users based on taking into account user-specific profile information. A "non-targeted advertisement" refers to an advertisement shown to a large group of users without use of user-specific profile information; it may be "targeted" in a different sense, such as selected based on broad demographic characteristics, such as the demographic characteristics of users who watch a particular television program. A variety of technological approaches are employed to achieve proper insertion of targeted television advertisements into the stream of presented television content.

In some cases, capabilities of a so-called "smart television" (i.e., smart TV) are utilized to achieve insertion of the targeted, replacement television advertisement in place of a non-targeted television advertisement. A smart television, like any other television, has a connection to one or more television signal source devices. Examples of television signal source devices can include, but are not limited to: a digital antenna; a set-top box (STB) for cable, satellite, or Internet Protocol Television (IPTV); a digital video recorder (DVR); a so-called entertainment-oriented device (EOD) such as a game console or a so-called "Over The Top" device (OTT; examples include Apple TV® or Roku®). The smart TV receives from the television signal source device a television signal feed that has encoded thereon television content and presents via the television display the encoded television content. Television content, as used herein in any context, may comprise audio or video or both. Television content encoded in the television signal feed shall be referred to herein as the primary television content. The television content can be encoded into the television signal feed by the television signal source device, or it can merely pass through that device already encoded. The primary television content can include programming of any sort (e.g., live, recorded, on-demand, broadcast, multicast, unicast, and so on). The primary television content often includes one or more non-targeted or targeted television advertisements (broadcast, multicast, or unicast), which can be inserted by the television signal source device or are already present in the primary television content by the time the television signal feed reaches that device. An example can include a STB uncompressing a broadcasted MPEG2 compressed 720p television program into a 720p uncompressed format, which is delivered from the STB to a smart TV via an HDMI interface. The television program can include advertisements broadcasted as part of the program or advertisements inserted into the program by the STB (instead of or in addition to the broadcasted ads).

A smart TV also has its own connection to a computer network through which the smart TV can be provided with online access, e.g., access to the Internet. The smart TV can receive television content through the computer network connection. The smart TV also includes one or more computer processors or processor cores and one or more computer memories (collectively referred to hereinafter as the "smart TV computer" or simply the "computer") that enable it to receive, store, or process data or programming instructions. Such data and programming can be employed, e.g., to enable the smart TV to receive targeted television advertisements and to present them in place of non-targeted television advertisements that are part of the primary television content.

An example of a conventional method for inserting a targeted television advertisement into a stream of primary television content can be performed as follows using the computer network connection and the smart TV computer. The smart TV receives via the computer network electronic indicia of data representative of portions of the primary television content. First data represents the portion of the primary television content intended to be replaced (e.g., typically a non-targeted advertisement; referred to as the "to-be-replaced content" or simply "replaced content"); other data represents a portion of the primary television content that immediately precedes the replaced content (referred to as the "preceding content"; e.g., another advertisement or a portion of programming content). The smart TV receives via the computer network electronic indicia of second data representative of secondary television content (e.g., typically a targeted advertisement; referred to as the "replacement content"). Using the computer, the smart TV automatically (i) monitors the television signal feed it receives from the television signal source to detect or otherwise determine the end of the preceding content and (ii) presents after the preceding content, using the second data, the replacement content instead of the replaced content. Once the replacement content is presented, the smart TV can revert to presentation of the primary television content. In another example, the smart TV determines the end of the preceding content by identifying a signal or cue sent as part of the feed. The signal or cue could be embedded in the preceding content (such as in the last frame of the preceding content for example) or in the gap between the preceding content and replaced content or in the beginning of the replaced content.

In all cases discussed herein, data streams like the first data can comprise a so-called "fingerprint" of one or more portions of the primary television content (e.g., a digital video fingerprint generated in any suitable way), a compressed digital encoding of one or more portions of the primary television content, a raw, uncompressed encoding of one or more portions of the primary television content, or other suitable representative data that enables the smart TV to identify the corresponding television content in the television signal feed (i.e., the replaced or preceding content). If a fingerprint of the primary television content is employed, it can be generated according to any one of several known techniques or protocols. One example of a fingerprint of a segment of television content can rely on sampling within every video frame of that segment of the television content. The smart TV, or a central server in possession of the segment samples, can compare the samples of the segment with a sample taken by the smart TV from the television signal feed. Based on that comparison, the smart TV or the central server can recognize a specific frame within the segment. Likewise, the second data can comprise any suitable compressed or uncompressed encoding of the secondary television content (i.e., the replacement content). Different or parallel compression protocols can be used for first and second data. If a fingerprint of the primary television content is employed for the first data, it can be generated according to any one of several known techniques or protocols (one example can include taking a sample of audio, video, or both from the TV feed and comparing it with an equivalent sample of known content). A given fingerprint of television content can be generated based on both video and audio portions of that content, on the video portion only, or on the audio portion only.

In some other examples (in which fingerprints are not employed or employed partially), the smart TV receives via the Internet the first or second data in, e.g., MPEG4 or other compressed format. The compressed format saves bandwidth so as to enable the parallel transmission of a multitude of different targeted ads to a multitude of corresponding households watching television simultaneously. In one example, entire advertisements (not just portions; the preceding, replaced, and targeted advertisements) are sent to the smart TV, which then uncompresses the three advertisements. The uncompressed preceding ad is compared with the uncompressed television signal feed transmitted from the STB, e.g., via HDMI. At the end of the preceding ad, the uncompressed, targeted, replacement advertisement is inserted by the smart TV in place of the replaced advertisement. While presenting the targeted, replacement advertisement, the smart TV monitors the television signal feed for changes in the replaced advertisement by comparing the feed with the replaced advertisement received over the Internet. Alternatively, instead of comparing uncompressed television signal feed and received advertisements, the smart TV instead can compress the television signal feed and do the comparisons described above using the compressed television signal feed and received advertisements.

The example methods and systems described above create a technical problem relating to viewer control. Typically, the television signal source device mediates viewer control of the presentation of the primary television content. Various user-control actions can be executed through the television signal source device, whether by direct manipulation (e.g., pushing buttons on a STB), by use of a remote control, or by use of an auxiliary device (e.g., a tablet or smartphone software application controlling the STB). Examples of user-control actions executed through the television signal source device can include a channel change or a display change.

A channel change denotes switching among multiple different streams of distinct broadcast, multicast, unicast, or locally stored television content that can be live, prerecorded, time-shifted, or on-demand. A display change can include: (i) a so-called "trick mode" (e.g.: fast forward at various speeds such as 4×, 8×, 32×, or other; rewind or fast reverse at various speeds such as 4×, 8×, 32×, or other; pause or resume; or skipping forward or backward by various specified time intervals, numbers of frames, or scenes); (ii) loop, repeat, or replay; (iii) slow motion or stop action; (iv) changing the zoom, stretch, or aspect ratio; (v) changing viewing angle or other 3D viewing parameter(s); (vi) changing between, e.g., "standard," "movie," "sports," "game," or other display presets; or (vii) changing backlight, contrast, brightness, color, tint sharpness, color temperature, or other picture quality parameters.

Such user-control actions, when executed through the television signal source device, affect the television signal feed, which in turn affects the presentation by the smart TV of the primary television content. In that capacity, the smart TV acts as a passive presentation device, becoming "active" (i.e., directly affecting the presentation of television content) only when it presents a replacement advertisement or other replacement television content. Note that some display changes can also be executed using the smart TV (e.g., items (iv)-(vii) listed above, or even items (i)-(iii) if the smart TV has sufficient memory or buffering capabilities), even when presenting television content provided by the television signal source device via the television signal feed. However, only those display changes executed through the television signal source device are considered for purposes of the present disclosure or appended claims.

Because user-control actions, when executed through the television signal source device, affect only the television signal feed from the television signal source device, such user-control actions ordinarily would have no discernible effect on any replacement television content being presented on the smart TV display. In other words, in conventional techniques, if a viewer attempts to execute a control action during presentation of the replacement content, the control action would appear disabled. The control action indeed would affect the television signal feed (fast forward, pause, etc.), but the display would continue to show the replacement content, undisturbed by the control action. This state of affairs (i.e., seemingly ineffectual user-control actions) would persist until the replacement content finished showing, at which time presentation would revert to the primary television content (presumably modified, unbeknownst to the user, in compliance with the intervening user-control actions, or perhaps just the last user-control action).

It would be desirable to provide systems and methods that mitigate the problem described above.

SUMMARY

A method is performed using a computer associated with a television display and connected to a computer network and to a television signal source device (collectively, a so-called smart TV). The smart TV receives from the television signal source device a television signal feed having encoded thereon primary television content, and presents the primary television content via the television display. The computer is programmed to utilize data received via the computer network, including (i) first data comprising electronic indicia of a tobe-replaced portion of the primary television content and (ii) second data comprising electronic indicia of secondary television content. The computer is programmed to present automatically via the television display, using the second data, at least a portion of the secondary television content in place of the to-be-replaced television content.

The method comprises: (a) during presentation of the secondary television content, automatically monitoring, with the computer, the television signal feed and comparing it with the first data; and (b) in response to detecting any difference, between the television signal feed and the first data, indicative of a user-control action with respect to the television signal source device, automatically altering, with the computer, the presentation of the secondary television content in accordance with the user-control action.

Objects and advantages pertaining to presenting replacement television content using a smart TV may become apparent upon referring to the embodiments disclosed in the following written description or outlined in the appended claims.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION OF EMBODIMENTS

In one or more of the illustrative embodiments disclosed herein, various examples of methods for inserting a targeted television advertisement into a stream of primary television content can be performed as follows using various examples of systems that include the computer network connection and the computer of the smart TV. Parts of those methods proceed substantially as described above.

In a first group of one or more embodiments, using the computer and the first data, the smart TV automatically compares, during presentation of the replacement content via the smart TV, the television signal feed with the first data (representative of the replaced content). Any detected discrepancy between the television signal feed and the first data indicates that a user has performed a user-control action with respect to the television signal source device. For example, if the user attempts a display change (e.g., a trick mode) or a channel change, the first data (indicative of the replaced content at regular viewing speed), would no longer correspond to the television signal feed, because the user-control action would alter the signal feed. If no such discrepancy is detected (indicating no user-control action was attempted) and presentation of the replacement content finishes without any user-control action being taken, then in some embodiments, presentation of television content via the smart TV can, as in the conventional examples, simply revert to presentation of the primary television content. Depending on whether the replaced content is finished when the replacement content finishes, presentation may revert to an end portion of the replaced content or to a portion of the primary content immediately after the replaced content (referred to as the "succeeding content").

If the replacement television content ends before the replaced television content, an end portion of the replaced television content might be presented after completion of the replacement content. That may result in a television presentation that may be jarring, confusing, or annoying to viewers due to the abrupt and seemingly mysterious appearance of a fragment of the replaced content. In a second group of one or more embodiments, if the replacement content reaches its end before the end of the replaced content, the smart TV can present a black screen (or a blank screen of a different color, a user-selected color controlled by a user setting in the smart TV, or any other suitable filler material) to fill the gap between the end of the replacement content and the end of the replaced content. A black screen can be used in countries where a black screen identifies the end of one segment of television content and the beginning of a succeeding segment of unrelated television content (e.g., a transition from a television program to a television advertisement, from one television advertisement to another, or from a television advertisement to a television program). In countries where a different type of screen is used to identify the end of one segment of content and the beginning of the next, that corresponding kind of screen will be inserted as filler content by the smart TV to fill the gap from the end of the replacement content to the end of the replaced content. In one example implementation of a black screen, the smart TV inserts the black frames. When the smart TV, using the computer and the first data, detects the end of the replaced content in the television signal feed while presenting such filler content, it can then revert presentation to the primary television content encoded in the television signal feed, providing the viewer with a smooth transition from the replacement content to the succeeding content.

If, on the other hand, the smart TV does detect a discrepancy between the first data (indicative of the replaced content) and the television signal feed, that indicates that a user-control action was attempted. In a third group of one or more embodiments, in response to detecting such a discrepancy, the smart TV automatically terminates presentation of the replacement content and reverts to presentation of the replaced content. That shift eliminates the misleading appearance that the user-control action did not work, because the smart TV discontinues presentation of the replacement content and the viewer can see the effects of his or her control action on the resumed presentation of the replaced content.

However, as with the case where the replacement content ends before the replaced content ends, this situation also results in presentation of television content that may appear jarring, confusing, or annoying to viewers due to the sudden switch, upon attempting to execute a user-control action, between different television advertisements. An exception is the case wherein the user-control action is a channel change; in that instance the abrupt appearance of different television content would be expected.

A fourth group of one or more embodiments help eliminate the presentation problems described in the previous paragraphs. In response to detecting a discrepancy between the first data (representative of the replaced content) and the television signal feed, the smart TV can automatically, using the computer and the first data, determine what type of user-control action has been executed, e.g., fast forward, fast reverse, pause, or channel change. Because the user-control action is done with respect to the television signal source device, and not the smart TV, determination of the type of user-control action cannot typically be done directly. Instead, the smart TV determines the user-control action by comparing the first data and the television signal feed. For example, if the first data includes the video portion of the replaced content, then the smart TV can compare the first data video with the video portion of the television signal feed. A pause action on the signal source device results in the freezing of the video on one particular frame. The smart TV can identify the frozen frame by comparing the first data video frames with the signal feed frozen frame. The comparison can be made between entire frames or between only sample sets of pixels of each frame. A fast forward action on the signal source device results in only selected frames being sent in the television signal feed to the smart TV (the higher the fast forward rate, the fewer and further between are the selected frames sent to the smart TV). The smart TV can compare whole frames or sample pixels in the received signal feed frames with whole frames or sample pixels in the first data to recognize the selected fast-forward rate (e.g., 4×, 8×, or 32× regular viewing speed). A fast reverse action on the signal source device can be identified in a similar way. A channel change can be identified when the smart TV cannot find a match between a frame of the video in the television signal feed and a frame of the video in the first data. The comparison of the television signal feed and the first data typically is based on video for recognizing a display change, including trick mode functionality such as pause, resume, fast forward, rewind, fast reverse, or skip. For recognizing a channel switch or the end of a replaced advertisement, audio or video or both can be used as a basis for comparison. Alternatively, the smart TV can determine the type of user-control action in those cases wherein the television signal source device reports the type of user-control action to the smart TV, for example via a CEC (Consumer Electronics Control) connection over HDMI.

If the user-control action is a channel change, then the smart TV can simply terminate presentation of the replacement television content and revert to presentation of the replaced television content encoded on the television signal feed (now altered due to the channel change). As noted above, the abrupt appearance of different presented television content would be expected in that instance.

If the smart TV determines that the user-control action is a display change such as a trick mode, then, using the computer and the second data, the smart TV can alter presentation of the replacement content to substantially match the altered television signal feed. For example, if a fast forward of the replaced content is detected, then the smart TV can adjust presentation of the replacement content by fast-forwarding it in parallel (e.g., by skipping frames). The smart TV can be programmed to mimic in its presentation of the replacement content the effect of various user-control display change actions on the replaced content. The substitution of the replacement content for the replaced content therefore becomes "transparent" to the viewer, who can no longer necessarily discern whether he or she is seeing the original television content (e.g., a non-targeted television advertisement) versus replacement television content (e.g., a targeted television advertisement). User-control actions (channel change or display change) appear to function normally even if replacement content is being presented.

In a fifth group of one or more embodiments, after the replacement content has been presented and its display completed, the smart TV can again insert the replacement content if, for example, a rewind or fast reverse user-control action is executed beginning from a time after the conclusion of the replacement content. To accomplish this, the sequence of steps described above can be executed again, with the smart TV detecting the succeeding content, presenting the replacement content (possibly altered depending on user-control actions), monitoring the television signal feed during a second presentation of the replacement content, and terminating or altering the repeated presentation of the replacement content in response to a user-control action. A purpose of this technique is to allow the user to review the replacement content after the succeeding television show (for example) resumes. Without this technique, if the user rewinds from a point after the replacement content has been completed, the user would see the replaced content instead of the replacement content, and the user would not be able to find the replacement content. To enable such "rewinding" of the replacement content, the smart TV receives electronic indicia of additional data that represents a portion of the primary television content that immediately follows the replaced content (i.e., the succeeding content) or creates such additional data by itself, for example by fingerprinting the succeeding content or simply recording it. The smart TV automatically monitors the rewound television signal feed it receives from the television signal source and compares it with the additional data to detect or otherwise determine the beginning of the succeeding content.

In some instances, the same replacement content can be inserted each time the replaced content (or preceding content or succeeding content) is detected by the smart TV. In other instances, different replacement content can be inserted in place of the replaced content; the choice of replacement content is part of the targeting process when the replacement content is a targeted advertisement. Any suitable sequence of replacement content can be employed for insertion in place of a given portion of replaced content upon repeated encounters with that given portion. In one example, the same advertisement can be presented each time the given portion of replaced content is encountered (forward or backward). In another example, one advertisement can be presented a number of times, followed by another advertisement presented a number of times, and so on. In a third example, number of different advertisements can be rotated through one at a time at each encounter with the replaced content. In a fourth example, each replacement advertisement is presented during only one encounter with the given replacement content; at each subsequent encounter a new advertisement is presented that has not been presented before.

In a sixth group of one or more embodiments, if the television content that includes the preceding and succeeding content is replayed at a later time (e.g., stored on a DVR or retrieved from an "on-demand" system), the same replacement content can be presented each time the primary content is replayed, or different replacement content can be selected than would be selected for the initial or earlier presentations of the content. Subsequent replays can include still other replacement content. Any suitable variation, selection, or rotation of replacement content, including those described in the preceding paragraph, can be employed.

The systems and methods disclosed herein can be implemented as general or special purpose computers or servers or other programmable hardware devices programmed through software, or as hardware or equipment "programmed" through hard wiring, or a combination of the two. A "computer" (e.g., as in a "smart TV") can comprise a single processor, processor core, or machine or can comprise multiple interacting processors, processor cores, or machines (located at a single location or at multiple locations remote from one another). A computer memory or computer-readable medium can be encoded with a computer program, so that execution of that program by one or more computers causes the one or more computers to perform one or more of the methods disclosed herein. Suitable media can include temporary or permanent storage or replaceable media, such as network-based or Internet-based or otherwise distributed storage of software modules that operate together, RAM, ROM, CD ROM, CD-R, CD-R/W, DVD ROM, DVD±R, DVD±R/W, hard drives, thumb drives, flash memory, optical media, magnetic media, semiconductor media, or any future storage alternatives. Such encoded media can be preinstalled already encoded in a smart TV during its manufacture, can be encoded after installation into a smart TV during its manufacture, or can be encoded with "client" or "application"

software copied or downloaded into the smart TV after its manufacture. For example, client software can be downloaded to the smart TV as part of occasional or periodic software updates received by the smart TV, typically via its network connection.

In addition to the preceding, the following examples fall within the scope of the present disclosure or appended claims:

EXAMPLE 1

A method performed using a computer associated with a television display and connected to a computer network and to a television signal source device, wherein: a television signal feed having encoded thereon primary television content is received from the television signal source device and the primary television content is presented via the television display; the computer is programmed to utilize data received via the computer network, including (i) first data comprising electronic indicia of a to-be-replaced portion of the primary television content and (ii) second data comprising electronic indicia of secondary television content; the computer is programmed to present automatically via the television display, using the second data, at least a portion of the secondary television content in place of the to-be-replaced television content; and the method comprises: (a) during presentation of the secondary television content, automatically monitoring, with the computer, the television signal feed and comparing it with the first data; and (b) in response to detecting any difference, between the television signal feed and the first data, indicative of a user-control action with respect to the television signal source device, automatically altering, with the computer, the presentation of the secondary television content in accordance with the user-control action.

EXAMPLE 2

The method of Example 1 further comprising reverting to presentation of the primary television content after presenting the secondary television content.

EXAMPLE 3

The method of any preceding Example wherein (i) the user-control action indicated by the detected difference between the television signal feed and the first data is a channel change, and (ii) altering the presentation of the secondary television content comprises terminating presentation of the secondary television content and resuming presentation of the primary television content.

EXAMPLE 4

The method of any preceding Example wherein (i) the user-control action indicated by the detected difference between the television signal feed and the first data is a display change, and (ii) altering the presentation of the secondary television content comprises altering presentation of the secondary television content in a manner analogous to the user-control action indicated by the detected difference between the television signal feed and the first data.

EXAMPLE 5

The method of any preceding Example wherein (i) the primary television content comprises one or more television programs and one or more associated television advertisements, and (ii) the secondary television content comprises one or more replacement television advertisements.

EXAMPLE 6

The method of any preceding Example further comprising, after presenting the secondary television content, automatically presenting filler television content via the television display in place of an end portion of the to-be-replaced television content.

EXAMPLE 7

The method of an preceding Example further comprising, after presenting the secondary television content and after a user-control action of rewinding or fast-reversing the primary television content to a point within or before the to-be-replaced television content, again automatically presenting at least a portion of the secondary television content in place of the to-be-replaced television content.

EXAMPLE 8

The method of any preceding Example further comprising: (c) after presenting the secondary television content and during later time-shifted or on-demand presentation of the primary television content via the television display, automatically presenting different secondary television content in place of the to-be-replaced television content; (d) during presentation of the different secondary television content, automatically monitoring, with the computer, the television signal feed and comparing it with the first data; and (e) in response to detecting any difference, between the television signal feed and the first data, indicative of a user-control action with respect to the television signal source device, automatically altering, with the computer, the presentation of the different secondary television content in accordance with the user-control action.

EXAMPLE 9

A smart TV comprising: a connection to a television signal source device arranged so as to receive from the television signal source a television signal feed having encoded thereon primary television content; a television display structured and connected to present the primary television content; a computer; and a connection to a computer network, wherein the computer is programmed to perform the method of any preceding Example.

EXAMPLE 10

An article comprising a computer-readable medium in a smart TV or in a storage device controlled by a server connected to a computer network, which medium encodes computer-readable instructions that, when applied to a computer in a smart TV, instruct the computer to perform the method of any preceding Example.

It is intended that equivalents of the disclosed illustrative embodiments and methods shall fall within the scope of the present disclosure or appended claims. It is intended that the disclosed illustrative embodiments and methods, and equivalents thereof, may be modified while remaining within the scope of the present disclosure or appended claims.

In the foregoing Detailed Description, various features may be grouped together in several illustrative embodiments for the purpose of streamlining the disclosure. This method of disclosure is not to be interpreted as reflecting an intention that any claimed embodiment requires more features than are expressly recited in the corresponding claim. Rather, as the appended claims reflect, inventive subject matter may lie in less than all features of a single disclosed embodiment. Thus, the appended claims are hereby incorporated into the Detailed Description, with each claim standing on its own as a separate disclosed embodiment. However, the present disclosure shall also be construed as implicitly disclosing any embodiment having any suitable set of one or more disclosed or claimed features (i.e., sets of features that are not incompatible or mutually exclusive) that appear in the present disclosure or the appended claims, including those sets that may not be explicitly disclosed herein. In particular, any embodiment that falls within any one of the six groups of embodiments disclosed above, and any embodiment that falls within any combination of two or more of those six groups of embodiments, shall be regarded as falling within the scope of the present disclosure or appended claims. Further, any embodiment explicitly or implicitly disclosed herein can be implemented using any suitable set of one or more known or future developed features, including but not limited to those disclosed in the Background. It should be further noted that the scope of the appended claims do not necessarily encompass the whole of the subject matter disclosed herein.

For purposes of the present disclosure and appended claims, the conjunction "or" is to be construed inclusively (e.g., "a dog or a cat" would be interpreted as "a dog, or a cat, or both"; e.g., "a dog, a cat, or a mouse" would be interpreted as "a dog, or a cat, or a mouse, or any two, or all three"), unless: (i) it is explicitly stated otherwise, e.g., by use of "either . . . or," "only one of," or similar language; or (ii) two or more of the listed alternatives are mutually exclusive within the particular context, in which case "or" would encompass only those combinations involving non-mutually-exclusive alternatives. For purposes of the present disclosure or appended claims, the words "comprising," "including," "having," and variants thereof, wherever they appear, shall be construed as open ended terminology, with the same meaning as if the phrase "at least" were appended after each instance thereof.

In the appended claims, if the provisions of 35 USC §112 ¶6 are desired to be invoked in an apparatus claim, then the word "means" will appear in that apparatus claim. If those provisions are desired to be invoked in a method claim, the words "a step for" will appear in that method claim. Conversely, if the words "means" or "a step for" do not appear in a claim, then the provisions of 35 USC §112 ¶6 are not intended to be invoked for that claim.

If any one or more disclosures are incorporated herein by reference and such incorporated disclosures conflict in part or whole with, or differ in scope from, the present disclosure, then to the extent of conflict, broader disclosure, or broader definition of terms, the present disclosure controls. If such incorporated disclosures conflict in part or whole with one another, then to the extent of conflict, the later-dated disclosure controls.

The Abstract is provided as required as an aid to those searching for specific subject matter within the patent literature. However, the Abstract is not intended to imply that any elements, features, or limitations recited therein are necessarily encompassed by any particular claim. The scope of subject matter encompassed by each claim shall be determined by the recitation of only that claim.

What is claimed is:

1. A method performed using a computer associated with a television display and connected to a computer network and to a television signal source device, wherein:
   a television signal feed having encoded thereon primary television content is received from the television signal source device and the primary television content is presented via the television display;
   the computer is programmed to utilize data received via the computer network, including (i) first data comprising electronic indicia of a to-be-replaced portion of the primary television content and (ii) second data comprising electronic indicia of secondary television content;
   the computer is programmed to present automatically via the television display, using the second data, at least a portion of the secondary television content in place of the to-be-replaced television content; and
   the method comprises:
   (a) during presentation of the secondary television content, automatically monitoring, with the computer, the television signal feed and comparing it with the first data; and
   (b) in response to detecting any difference, between the television signal feed and the first data, indicative of a user-control action with respect to the television signal source device, and without receiving the user-control action at the computer associated with the television display, automatically altering, with the computer, the presentation of the secondary television content in accordance with the user-control action.

2. The method of claim 1 further comprising reverting to presentation of the primary television content after presenting the secondary television content.

3. The method of claim 1 wherein (i) the user-control action indicated by the detected difference between the television signal feed and the first data is a channel change, and (ii) altering the presentation of the secondary television content comprises terminating presentation of the secondary television content and resuming presentation of the primary television content.

4. The method of claim 1 wherein (i) the user-control action indicated by the detected difference between the television signal feed and the first data is a display change, and (ii) altering the presentation of the secondary television content comprises altering presentation of the secondary television content in a manner analogous to the user-control action indicated by the detected difference between the television signal feed and the first data.

5. The method of claim 1 wherein (i) the primary television content comprises one or more television programs and one or more associated television advertisements, and (ii) the secondary television content comprises one or more replacement television advertisements.

6. The method of claim 1 further comprising, after presenting the secondary television content, automatically presenting filler television content via the television display in place of an end portion of the to-be-replaced television content.

7. The method of claim 1 further comprising, after presenting the secondary television content and after a user-control action of rewinding or fast-reversing the primary television content to a point within or before the to-be-replaced television content, again automatically presenting at least a portion of the secondary television content in place of the to-be-replaced television content.

8. The method of claim 1 further comprising:
   (c) after presenting the secondary television content and during later time-shifted or on-demand presentation of the primary television content via the television display, automatically presenting different secondary television content in place of the to-be-replaced television content;

(d) during presentation of the different secondary television content, automatically monitoring, with the computer, the television signal feed and comparing it with the first data; and (e) in response to detecting any difference, between the television signal feed and the first data, indicative of a user-control action with respect to the television signal source device, automatically altering, with the computer, the presentation of the different secondary television content in accordance with the user-control action.

9. The method of claim 1 wherein (i) the computer and the television display comprise a smart television and (ii) the television signal source device comprises a cable or satellite set-top box.

10. A smart TV comprising:

a computer;

a connection to a television signal source device arranged so as to receive from the television signal source device a television signal feed having encoded thereon primary television content;

a television display structured and connected to present the primary television content; and a connection to a computer network, wherein:

the computer is programmed to utilize data received via the computer network, including (i) first data comprising electronic indicia of a to-be-replaced portion of the primary television content and (ii) second data comprising electronic indicia of secondary television content;

the computer is programmed to present automatically via the television display, using the second data, at least a portion of the secondary television content in place of the to-be-replaced television content; and the computer is programmed to perform a method comprising:

(a) during presentation of the secondary television content, automatically monitoring, with the computer, the television signal feed and comparing it with the first data; and (b) in response to detecting any difference, between the television signal feed and the first data, indicative of a user-control action with respect to the television signal source device, and without receiving the user-control action at the smart TV, automatically altering, with the computer, the presentation of the secondary television content in accordance with the user-control action.

11. The smart TV of claim 10 wherein the method further comprises reverting to presentation of the primary television content after presenting the secondary television content.

12. The smart TV of claim 10 wherein (i) the user-control action indicated by the detected difference between the television signal feed and the first data is a channel change, and (ii) altering the presentation of the secondary television content comprises terminating presentation of the secondary television content and resuming presentation of the primary television content.

13. The smart TV of claim 10 wherein (i) the user-control action indicated by the detected difference between the television signal feed and the first data is a display change, and (ii) altering the presentation of the secondary television content comprises altering presentation of the secondary television content in a manner analogous to the user-control action indicated by the detected difference between the television signal feed and the first data.

14. The smart TV of claim 10 wherein (i) the primary television content comprises one or more television programs and one or more associated television advertisements, and (ii) the secondary television content comprises one or more replacement television advertisements.

15. The smart TV of claim 10 wherein the method further comprises, after presenting the secondary television content, automatically presenting filler television content via the television display in place of an end portion of the to-be-replaced television content.

16. The smart TV of claim 10 wherein the method further comprises, after presenting the secondary television content and after a user-control action of rewinding or fast-reversing the primary television content to a point within or before the to-be-replaced television content, again automatically presenting at least a portion of the secondary television content in place of the to-be-replaced television content.

17. The smart TV of claim 10 wherein the method further comprises:

(c) after presenting the secondary television content and during later time-shifted or on-demand presentation of the primary television content via the television display, automatically presenting different secondary television content in place of the to-be-replaced television content;

(d) during presentation of the different secondary television content, automatically monitoring, with the computer, the television signal feed and comparing it with the first data; and (e) in response to detecting any difference, between the television signal feed and the first data, indicative of a user-control action with respect to the television signal source device, automatically altering, with the computer, the presentation of the different secondary television content in accordance with the user-control action.

18. The smart TV of claim 10 wherein (i) the computer and the television display comprise a smart television and (ii) the television signal source device comprises a cable or satellite set-top box.

19. An article comprising a tangible computer-readable medium that is not a transitory propagating signal, in a smart TV or in a storage device controlled by a server connected to a computer network, which medium encodes computer-readable instructions that, when applied to a computer in a smart TV, instruct the computer to perform a method wherein:

a television signal feed having encoded thereon primary television content is received from the television signal source device and the primary television content is presented via the television display;

the computer is programmed to utilize data received via the computer network, including (i) first data comprising electronic indicia of a to-be-replaced portion of the primary television content and (ii) second data comprising electronic indicia of secondary television content;

the computer is programmed to present automatically via the television display, using the second data, at least a portion of the secondary television content in place of the to-be-replaced television content; and the method comprises:

(a) during presentation of the secondary television content, automatically monitoring, with the computer, the television signal feed and comparing it with the first data; and (b) in response to detecting any difference, between the television signal feed and the first data, indicative of a user-control action with respect to the television signal source device, and without receiving the user-control action at the computer of the smart TV, automatically altering, with the computer, the presentation of the secondary television content in accordance with the user-control action.

20. The article of claim 19 wherein the method further comprises reverting to presentation of the primary television content after presenting the secondary television content.

21. The article of claim 19 wherein (i) the user-control action indicated by the detected difference between the television signal feed and the first data is a channel change, and (ii) altering the presentation of the secondary television content comprises terminating presentation of the secondary television content and resuming presentation of the primary television content.

22. The article of claim 19 wherein (i) the user-control action indicated by the detected difference between the television signal feed and the first data is a display change, and (ii) altering the presentation of the secondary television content comprises altering presentation of the secondary television content in a manner analogous to the user-control action indicated by the detected difference between the television signal feed and the first data.

23. The article of claim 19 wherein (i) the primary television content comprises one or more television programs and one or more associated television advertisements, and (ii) the secondary television content comprises one or more replacement television advertisements.

24. The article of claim 19 wherein the method further comprises, after presenting the secondary television content, automatically presenting filler television content via the television display in place of an end portion of the to-be-replaced television content.

25. The article of claim 19 wherein the method further comprises, after presenting the secondary television content and after a user-control action of rewinding or fast-reversing the primary television content to a point within or before the to-be-replaced television content, again automatically presenting at least a portion of the secondary television content in place of the to-be-replaced television content.

26. The article of claim 19 wherein the method further comprises:
  (c) after presenting the secondary television content and during later time-shifted or on-demand presentation of the primary television content via the television display, automatically presenting different secondary television content in place of the to-be-replaced television content;
  (d) during presentation of the different secondary television content, automatically monitoring, with the computer, the television signal feed and comparing it with the first data; and
  (e) in response to detecting any difference, between the television signal feed and the first data, indicative of a user-control action with respect to the television signal source device, automatically altering, with the computer, the presentation of the different secondary television content in accordance with the user-control action.

27. The article of claim 19 wherein (i) the computer and the television display comprise a smart television and (ii) the television signal source device comprises a cable or satellite set-top box.

* * * * *